United States Patent [19]

Takabatake

[11] Patent Number: 5,642,914

[45] Date of Patent: Jul. 1, 1997

[54] SUPPORT STRUCTURE FOR SUPPORTING FOAMABLE MATERIAL ON HOLLOW STRUCTURAL MEMBER

[75] Inventor: Yoshihiro Takabatake, Toyota, Japan

[73] Assignee: Neo-Ex Lab. Inc., Aichi-ken, Japan

[21] Appl. No.: 621,679

[22] Filed: Mar. 22, 1996

[30] Foreign Application Priority Data

Mar. 24, 1995 [JP] Japan .................. 7-066309
Apr. 20, 1995 [JP] Japan .................. 7-095390

[51] Int. Cl.⁶ ........................... B62D 29/04
[52] U.S. Cl. ............. 296/187; 296/205; 296/901
[58] Field of Search ................ 296/187, 203, 296/205, 901

[56] References Cited

U.S. PATENT DOCUMENTS 5,213,391   5/1993   Takagi .................. 296/25

FOREIGN PATENT DOCUMENTS

146478    11/1981   Japan .................. 296/901
146480    11/1981   Japan .................. 296/901
2-276836  11/1990   Japan .
406456317 A 6/1994  Japan .................. 296/203

Primary Examiner—Gary C. Hoge
Attorney, Agent, or Firm—Dennison, Meserole, Pollack & Scheiner

[57] ABSTRACT

A support structure for supporting a foamable material in a cavity of a hollow structural member so that the foamable material blocks the cavity of the hollow structural member when it is foamed by external heating. The support structure includes a support member including a main body which has an external dimension smaller than the dimension of a transverse cross section of the cavity, a foamable material receiving wall provided on the main body, and a restriction flange extending from at least one of the main body and the foamable material receiving wall. The support member is disposed in the cavity in such a manner that the restriction flange is substantially perpendicular to the longitudinal direction of the cavity. The foamable material has a substantially annular configuration and is profiled substantially to conform to the configuration of the transverse cross section of the cavity. The foamable material is arranged along the foamable material receiving wall of the support member.

7 Claims, 8 Drawing Sheets

SUPPORT STRUCTURE FOR SUPPORTING FOAMABLE MATERIAL ON HOLLOW STRUCTURAL MEMBER

BACKGROUND OF THE INVENTION

1. Field of the Invention

The present invention relates to a support structure for supporting a foamable material on a hollow structural member, and more particularly to a support structure for supporting a foamable material in a cavity of a closed box-like hollow structural member constituted of a plurality of pieces of plates or panels, such as a pillar, a rocker panel and a roof side panel of a vehicle body, in order that the foamable material blocks the cavity of the hollow structural member to increase damping powers, sound insulation powers and other powers of the hollow structural member when it is foamed by external heating.

2. Description of the Prior Art

Figure 13:
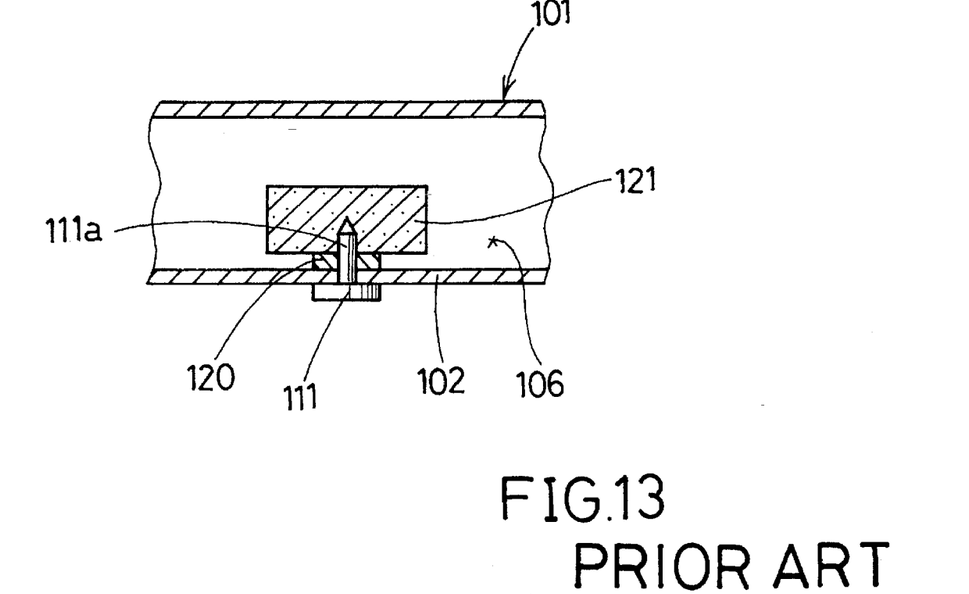
FIG. 13 is a sectional view showing a conventional support structure of a foamable material.

FIG. 13 exemplarily shows a conventional support structure. In this support structure, to support a foamable material 121 in a cavity 106 of a pillar 101 as a hollow structural member, a bolt 111 having a threaded section 111a is mounted on an inner pillar panel 102 so that the threaded section 111a is projected into the cavity 106 at a desired length. The threaded section 111a is then provided with a washer 120. The foamable material 121 engages the threaded section 111a by sticking so as to be seated on the washer 120. Thus, the foamable material 121 is supported in a cavity 106 of the pillar 101.

Such a support structure of the foamable material as described above is disclosed, for example, in Japanese Laid-Open Patent Publication No. 2-276836 (corresponding to British Patent Application No. 8903211.4).

Figure 14:
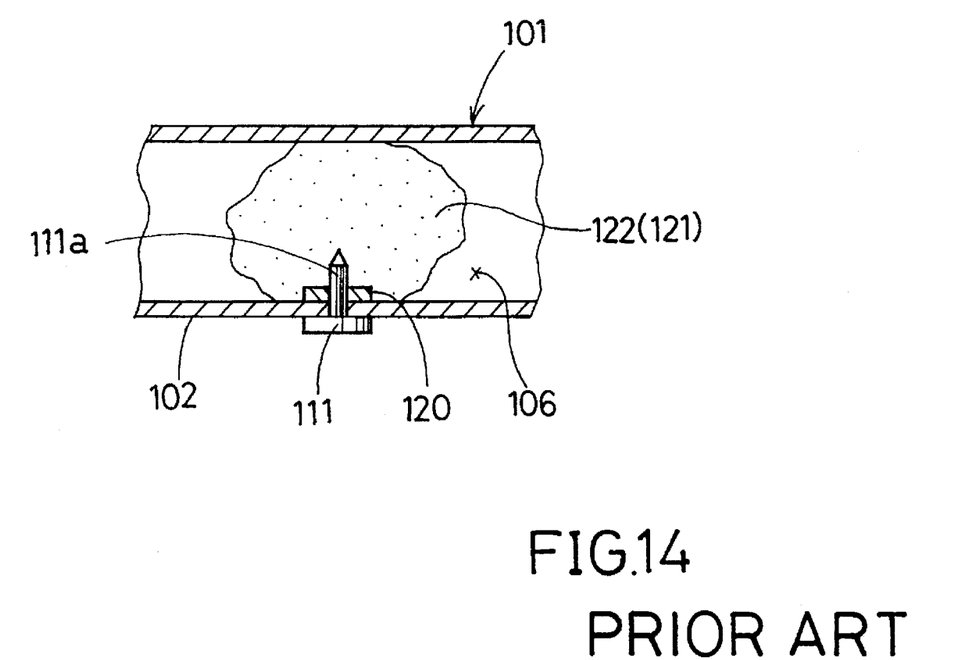
FIG. 14 is a sectional view showing the conventional support structure after the foamable material is foamed and expanded.

In the above-noted conventional support structure of the foamable material in which the foamable material 121 engages the threaded section 111a of the bolt 111 projected into the cavity 106 of the pillar 101, the foamable material 121 is unrestrictively expanded in all directions when it is foamed and expanded by heating externally of the pillar 101. Therefore, as shown in FIG. 14, the foamable material 121, when heated by external heating, is foamed and expanded to form a foamed product 122 which is unnecessarily elongated in a longitudinal direction of the the cavity 106.

Thus, to sufficiently block the cavity 106 by the foamed product 122, the foamable material 121 has to be extremely increased in amount. This may lead to increased cost.

SUMMARY OF THE INVENTION

It is an object of the invention to provide a support structure for supporting a foamable material in a cavity of a hollow structural member in which the problems associated with the conventional support structure can be eliminated.

It is another object of the invention to provide such a support structure in which the cavity can be efficiently blocked without increasing the amount of the foamable material.

It is a further object of the invention to provide such a support structure in which the foamable material can be easily and reliably positioned in the cavity.

In order to attain these objects, the present invention provides a support structure for supporting a foamable material in a cavity of a hollow structural member so that the foamable material blocks the cavity of the hollow structural member when it is foamed by external heating, which comprises a support member including a main body having an external dimension smaller than the dimension of a transverse cross section of the cavity, a foamable material receiving wall provided on the main body, and a restriction flange extending from at least one of the main body and the foamable material receiving wall, the support member being disposed in the cavity in such a manner that the restriction flange is substantially perpendicular to the longitudinal direction of the cavity, the foamable material having a substantially annular configuration and being profiled substantially to conform to the configuration of the transverse cross section of the cavity, the foamable material being arranged along the foamable material receiving wall of the support member.

With this support structure, the foamable material is retained on the support member in such a manner that at least one side surface thereof is restrictively covered by the restriction flange. The support member for retaining the foamable material is disposed in the cavity of the hollow structural member so that the restriction flange is perpendicular to the longitudinal direction of the cavity. Therefore, when the foamable material is foamed and expanded by external heating, the restriction flange prevents the at least one side surface of the foamable material from expanding in the longitudinal direction of the cavity, and this causes the foamable material to be effectively foamed and expanded in the directions perpendicular to the longitudinal direction of the cavity. As a result, the foamable material may be reliably adhered to an inner circumferential surface of the hollow structural member to efficiently block the cavity.

The support member may be provided with a fixture flange to be secured to an inner circumferential surface of the hollow structural member. The fixture flange may be welded to the inner circumferential surface of the hollow structural member by spot welding for retaining the support member in the cavity. Thus, the foamable material can be speedily and reliably positioned in the cavity.

The support member may be integrally formed of a piece of metal plate by press molding. Such a construction permits a reduced number of elements.

The foamable material may include a cut portion on which engagement means are provided to close the cut portion by engagement. With this construction, the foamable material can be easily assembled to the support member by means of the cut portion. Additionally, the foamable material as assembled can be prevented from dropping out from the support support member by means of the engagement means. Moreover, when the foamable material is foamed and expanded by heating, the engagement means may remain engaged to effectively close the cut portion of the foamable material. Therefore, a foamed product formed by heating is reliably adhered to the inner circumferential surface of the hollow structural member and an outer surface of the foamable material receiving wall. As a result, the cavity is efficiently blocked by the foamed product and the main body of the support member.

The present invention will become more fully apparent from the following description as it proceeds in connection with the drawings.

DETAILED DESCRIPTION OF THE PREFERRED EMBODIMENTS

Preferred embodiments of the invention will now be described in detail with reference to the drawings.

Figure 1:
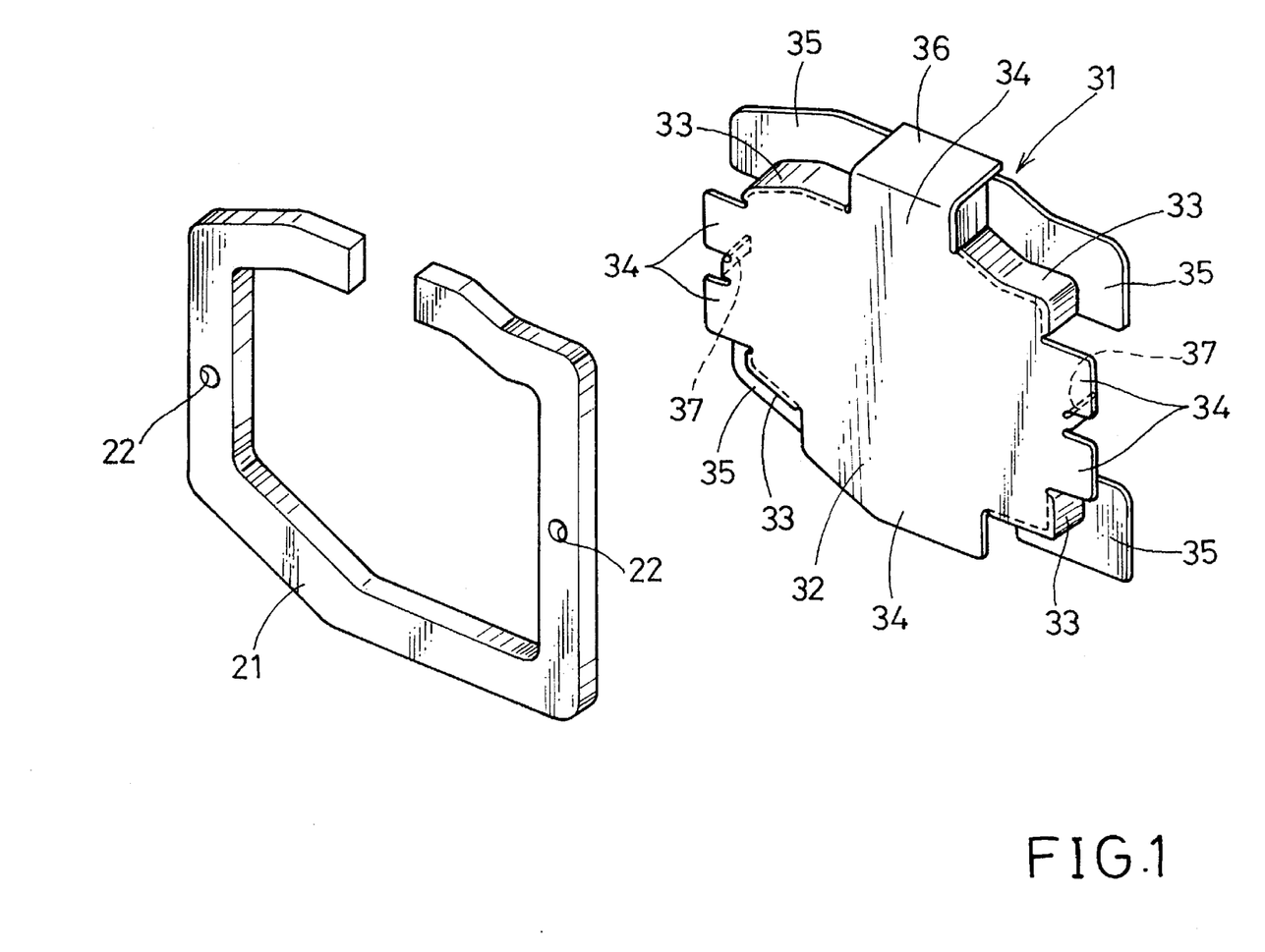
FIG. 1 is a perspective view of a support structure according to a first embodiment of the present invention, and in which a support member and a foamable material are shown in separated relation.
Figure 2:
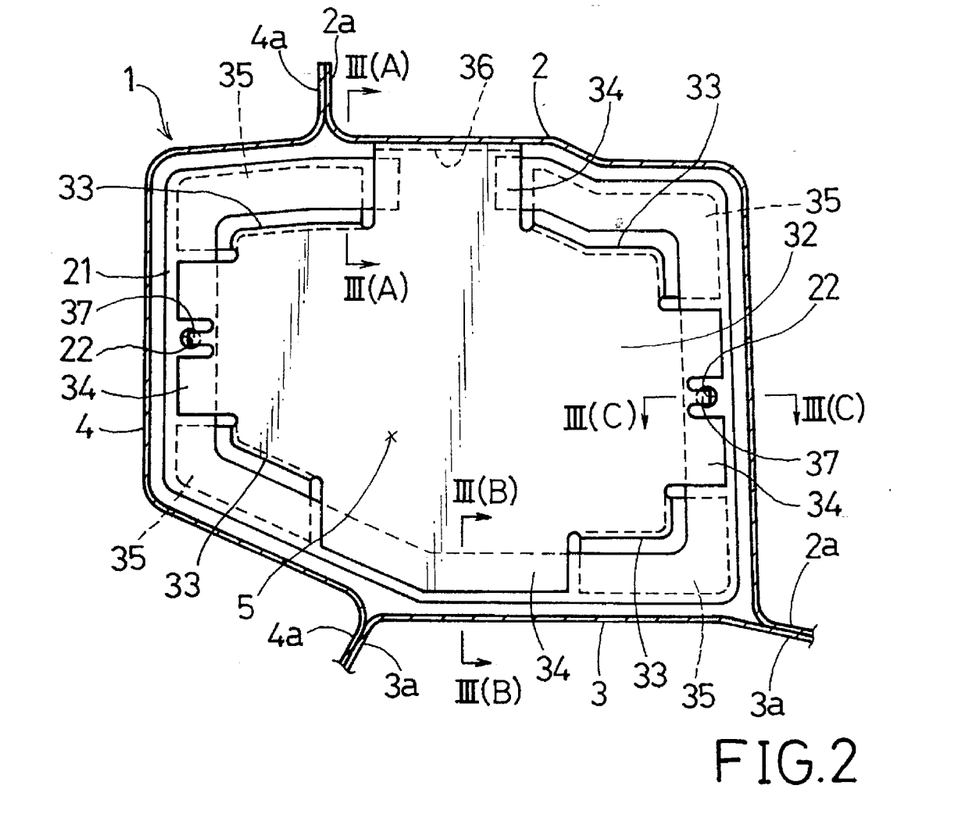
FIG. 2 is a side view of the support member and the foamable material as assembled and located in a cavity of a hollow structural member.
Figure 3A:
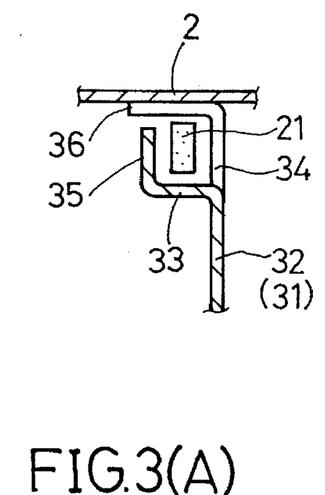
FIG. 3(A) is a sectional view taken along line III(A)—III(A) of FIG. 2.
Figure 3B:
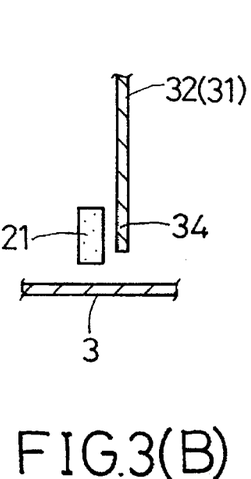
FIG. 3(B) is a sectional view taken along line III(B)—III(B) of FIG. 2.
Figure 3C:
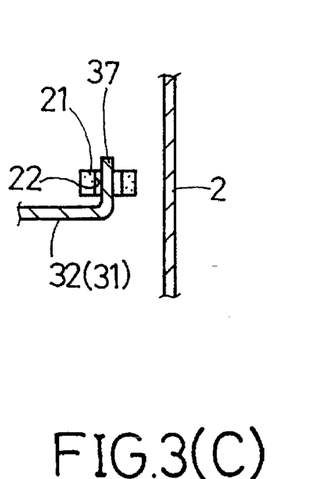
FIG. 3(C) is a sectional view taken along line III(C)—III(C) of FIG. 2.

Referring to FIGS. 1 to 5(C), shown therein is a first embodiment of the invention. A hollow structural member 1 such as a pillar, a rocker panel and a roof side panel of a vehicle body is constituted of a plurality of pieces of panels. In this embodiment, as shown in FIGS. 2 to 3(C), the hollow structural member 1 is constituted of an upper panel 2 having flanges 2a, a lower panel 3 having flanges 3a and a side panel 4 having flanges 4a. These panels 2, 3 and 4 are welded at the flanges 2a, 3a and 4a by spot welding to form the hollow structural member 1 into a closed box-like hollow body including a cavity 5 therein. The cavity 5 of the hollow structural member 1 receives a foamable material 21 which blocks the cavity 5 when it is foamed and expanded by external heating. The foamable material 21 is retained by a support member 31 disposed in the cavity 5.

The foamable material 21 is formed by injection molding or extrusion molding. As shown in FIGS. 1 and 2, the foamable material 21 has a substantially plate-like annular configuration and includes a cut-off section having a desired length therein. As will be recognized, the foamable material 21 is profiled substantially to conform to the configuration of the transverse cross section of the cavity 5 and has an external dimension slightly smaller than the dimension of the cross section of the cavity 5. Further, the foamable material 21 is provided with a desired number (shown as two for illustrative purposes) of small apertures 22 for positioning and retaining purposes.

The foamable material 21 used in this embodiment may be a foamable material disclosed in Japanese Laid-Open Patent Publication No. 2-276836. The foamable material is foamed and cured at a temperature from 110° C. to 190° C. to provide a closed cell type foamed product.

The formulation of the foamable material as disclosed is set forth below, on a weight percent basis.

| | |
|---|---|
| Copolymer of ethylene and methyl acrylate MI 0.7, MA 15% by weight | 63.55 |
| LDPE (melting point 1.5° C. density 0.919) | 27.15 |
| 4,4'-di,tert butyl peroxy n-butyl valerate (Trigonox 29/40) | 0.63 |
| bis (tert butyl peroxy isopropyl) benzene (Perkadox 14/40) | 1.63 |
| benzene sulphonyl hydrazide (Cellogen OT) | 3.62 |
| Azodicarbonamide (Porofor ADC-K) | 1.81 |
| di-ethylene glycol (DEG) | 1.81 |

The Porofor component contains zinc which activates the blowing activity of the foamable material.

As will be recognized, the foamable material 21 is not restricted to the composition described above and may be various types of materials which can be foamed and expanded by heating.

The support member 31 for retaining the foamable material 21 in the cavity 5 is integrally formed of a piece of metal plate by press molding. The support member 31 is constituted of a planar main body 32, foamable material receiving walls 33 extending from and perpendicular to the main body 32, first restriction walls 34 outwardly extending from and coplanar to the main body 32, second restriction walls 35 outwardly extending from and perpendicular to the foamable material receiving walls 33 and also parallel to the first restriction walls 34, a fixture flange 36 to be welded to an inner surface of the upper panel 2 of the hollow structural member 1 by spot welding, and retainer strips 37 to be inserted into the small apertures 22 of the foamable material 21 for positioning and retaining the foamable material 21.

The main body 32 is configured substantially to conform to the configuration of the transverse cross section of the cavity 5 and has an external dimension suitably smaller than the dimension of the cross section of the cavity 5. In this embodiment, as best shown in FIG. 1, the foamable material receiving walls 33 and the first restriction walls 34 are four in number, respectively, and are alternately arranged around the main body 32. The fixture flange 36 extends from and perpendicular to upper one of the first restriction walls 34. Further, each retainer strip 37 is formed on the right or left one of the first restriction walls 34 by folding a central part thereof at right angles.

The foamable material 21 is assembled to the support member 31 in a manner that an inner circumferential surface thereof faces outer surfaces of the foamable material receiving walls 33 and that the retainer strips 37 engage the small apertures 22. As will be appreciated, the foamable material 21 is easily assembled to the support member 31 only by slightly spreading the cut-off section thereof. Further, the cut-off section of the foamable material 21 is adapted to correspond to the upper first restriction wall 34 on which the fixture flange 36 is formed, so as to overlap the upper first restriction wall 34 when the foamable material 21 is assembled to the support member 31.

Processes for incorporating the foamable material 21 into the hollow structural member 1 and subsequent operations will now be described.

The foamable material 21 as unfoamed is previously mounted on the support member 31 in which the inner circumferential surface thereof faces the outer surfaces of the foamable material receiving walls 33 while engaging the small apertures 22 with the retainer strips 37. Thus, the foamable material 21 is properly positioned and retained on the support member 31.

The support member 31 with the foamable material 21 is introduced into the upper panel 2 in such a manner that the first and second restrictive flanges 34 and 35 are perpendicular to the longitudinal direction of the upper panel 2. Thereafter, the fixture flange 36 formed on the upper first restriction wall 34 is welded to the inner surface of the upper panel 2 by spot welding. Thus, the foamable material 21 is positioned on the upper panel 2 together with the support member 31.

Subsequently, the upper panel 2, the lower panel 3 and the side panel 4 are welded at the flanges 2a, 3a and 4a thereof by spot welding to form the hollow structural member 1 having the closed box-like hollow shape and encapsulating the foamable material 21 therein. As should be apparent, in the hollow structural member 1 thus formed, the support member 31 is arranged in the cavity 5 in such a manner that the first and second restrictive flanges 34 and 35 are perpendicular to the longitudinal direction of the cavity 5.

Figure 4:
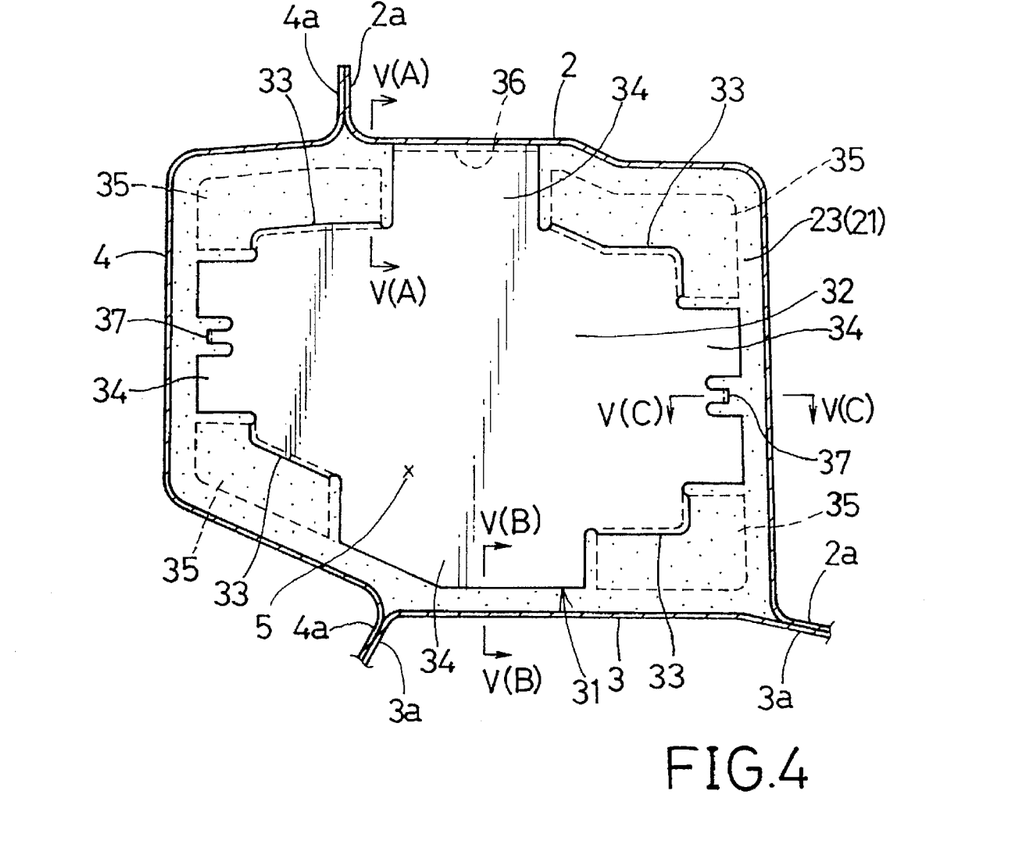
FIG. 4 is a side view of the support member and the foamable material as assembled and located in the cavity after the foamable material is foamed and expanded.
Figures 5A, 5B, 5C:
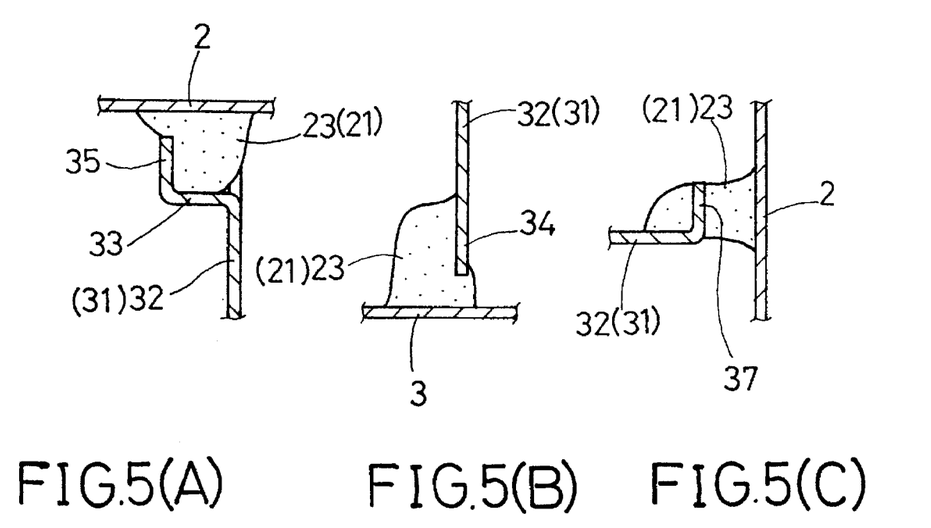
FIG. 5(A) is a sectional view taken along line V(A)—V(A) of FIG. 4.
FIG. 5(B) is a sectional view taken along line V(B)—V(B) of FIG. 4.
FIG. 5(C) is a sectional view taken along line V(C)—V(C) of FIG. 4.

Thereafter, the hollow structural member 1 with the foamable material 21 is heated by external heating, for example, by external heating for baking finishing of the automobile body. Thus, as shown in FIGS. 4 to 5(C), the foamable material 21 is foamed and expanded to produce the foamed product 23.

When the foamable material 21 is foamed and expanded by heating, the first and second restriction walls 34 and 35 prevent the foamable material 21 from expanding in the longitudinal direction of the cavity 5 of the hollow structural member 1, and this causes the foamable material 21 to be effectively foamed and expanded in directions perpendicular to the longitudinal direction of the cavity 5. This is because the foamable material 21 is retained between the first and second restriction walls 34 and 35 arranged perpendicular to the longitudinal direction of the cavity 5 so that both side surfaces thereof are restrictively covered by the first and second restriction walls 34 and 35. Therefore, the foamed product 23 thus produced is reliably adhered to an inner circumferential surface of the hollow structural member 1 and the outer surfaces of the foamable material receiving walls 33 of the support member 31. As a result, the cavity 5 is efficiently blocked by the foamed product 23 and the support member 31.

Figure 7:
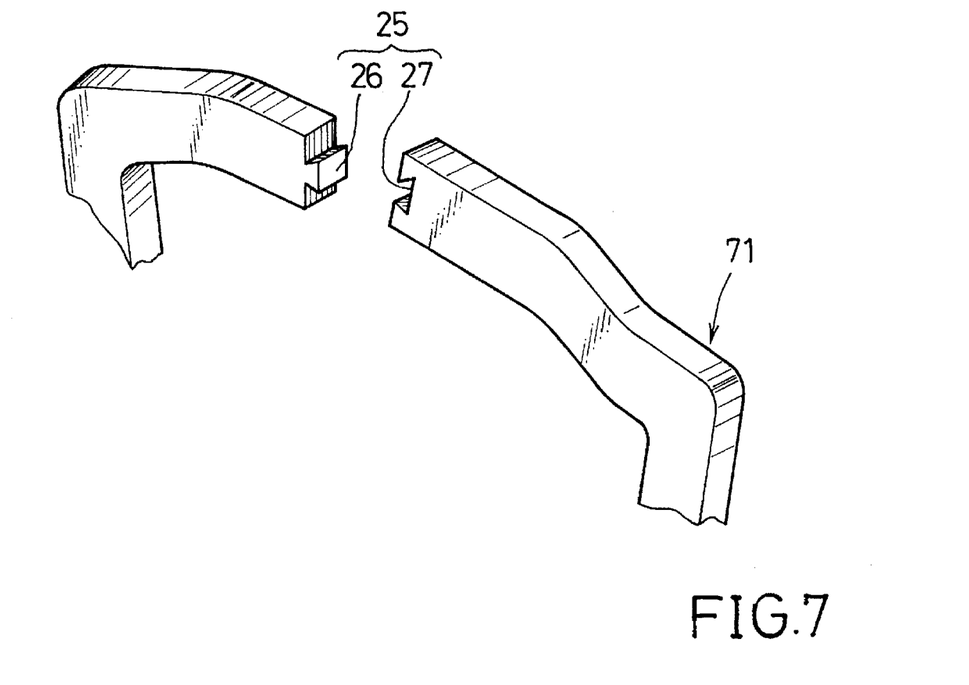
FIG. 7 is a segmentary perspective view of the foamable material, and in which an engagement projection and an engagement recess formed on opposed end surfaces of a cut portion thereof are shown in disengaged relation.
Figure 8:
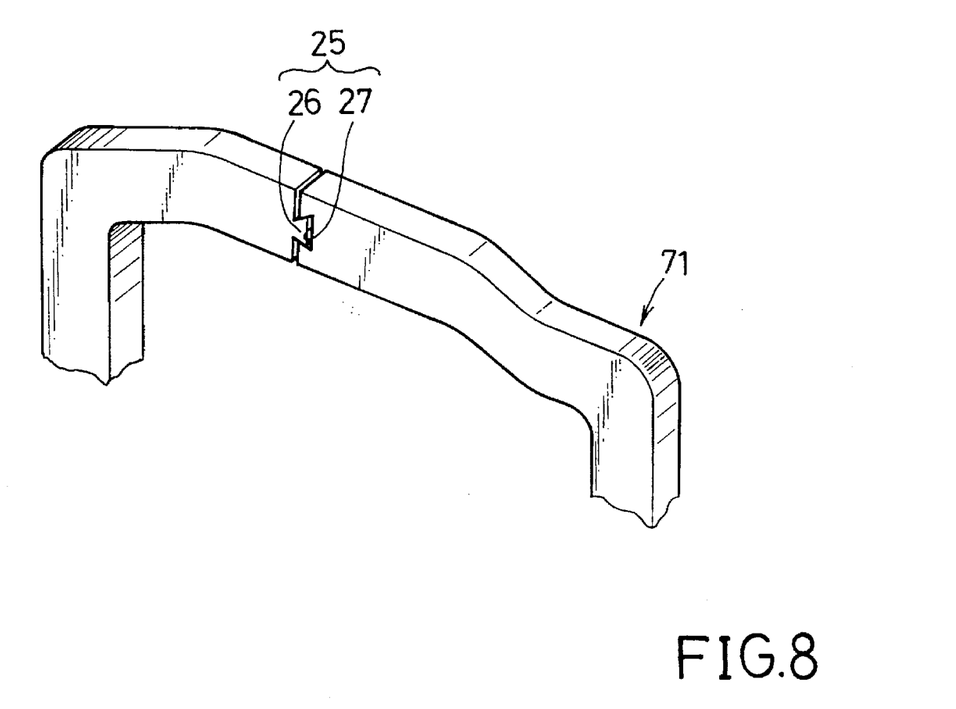
FIG. 8 is a segmentary perspective view of the foamable material, and in which the engagement projection and the engagement recess are shown in engaged relation.
Figure 9:
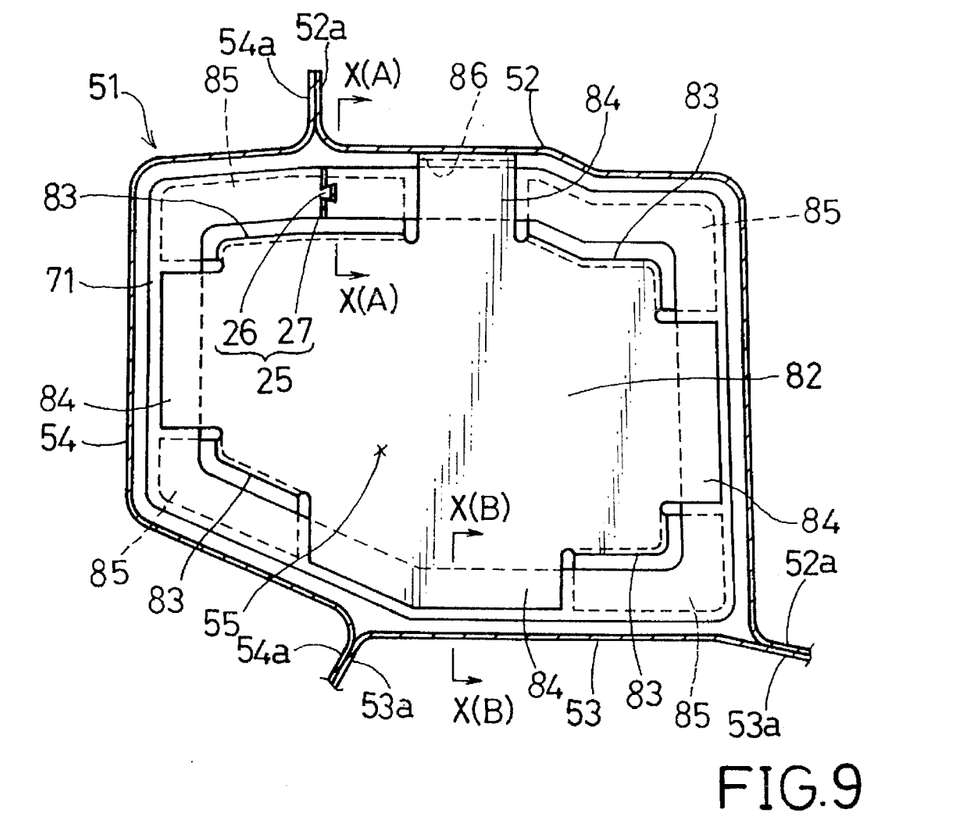
FIG. 9 is a side view of the support member and the foamable material as assembled and located in a cavity of a hollow structural member.
Figure 10A:
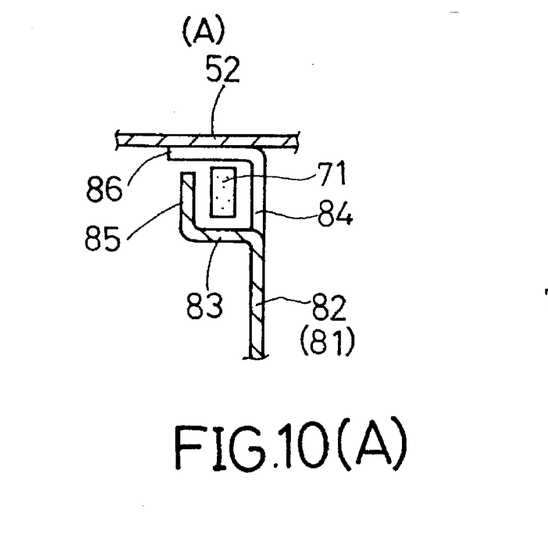
FIG. 10(A) is a sectional view taken along line X(A)—X(A) of FIG. 9.
Figure 10B:
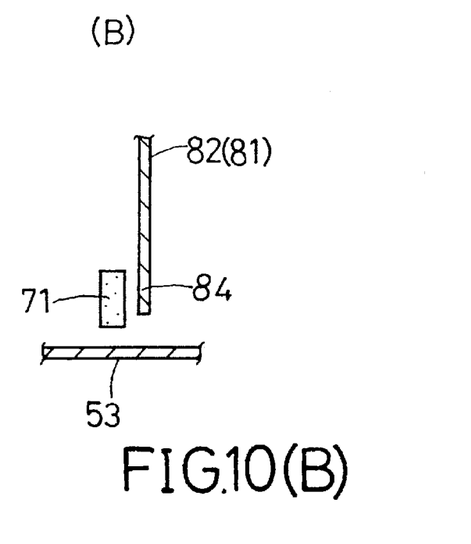
FIG. 10(B) is a sectional view taken along line X(B)—X(B) of FIG. 9.

Referring now to FIGS. 6 to 12(B), shown therein is a second embodiment of the invention. As shown in FIGS. 9 to 10(B), a hollow structural member 51 is constituted of an upper panel 52 having flanges 52a, a lower panel 53 having flanges 53a and a side panel 54 having flanges 54a. These panels 52, 53 and 54 are welded at the flanges 52a, 53a and 54a by spot welding to form the hollow structural member 51 into a closed box-like hollow body including a cavity 55 therein. The cavity 55 of the hollow structural member 51 receives a foamable material 71 which blocks the cavity 55 when it is foamed and expanded by external heating. The foamable material 71 is retained by a support member 81 disposed in the cavity 55.

As shown in FIGS. 6 to 12(B), the foamable material 71 has a substantially plate-like annular configuration and includes a cut portion therein. As will be recognized, the foamable material 71 is profiled substantially to conform to the configuration of the transverse cross section of the cavity 55 and has an external dimension slightly smaller than the dimension of the cross section of the cavity 55. Further, the foamable material 71 is provided with engagement means 25 formed on the cut portion thereof. The engagement means 25 may act as a connector to close the cut portion.

The engagement means 25 is constituted of an engagement projection 26 and an engagement recess 27 formed on opposed end surfaces of the cut portion of the foamable material 71. As will be understood, the engagement projection 26 and the engagement recess 27 are adapted to releasably engage each other to close the cut portion of the foamable material 71. In the illustrated embodiment, to increase connecting forces of the cut portion of the foamable material 71, the engagement projection 26 and the engagement recess 27 are formed as a "dovetail tenon" and a "dovetail recess", respectively, which permit formation of a dovetail joint therebetween.

Further, the foamable material 71 is of the same material as that used in the first embodiment.

Figure 6:
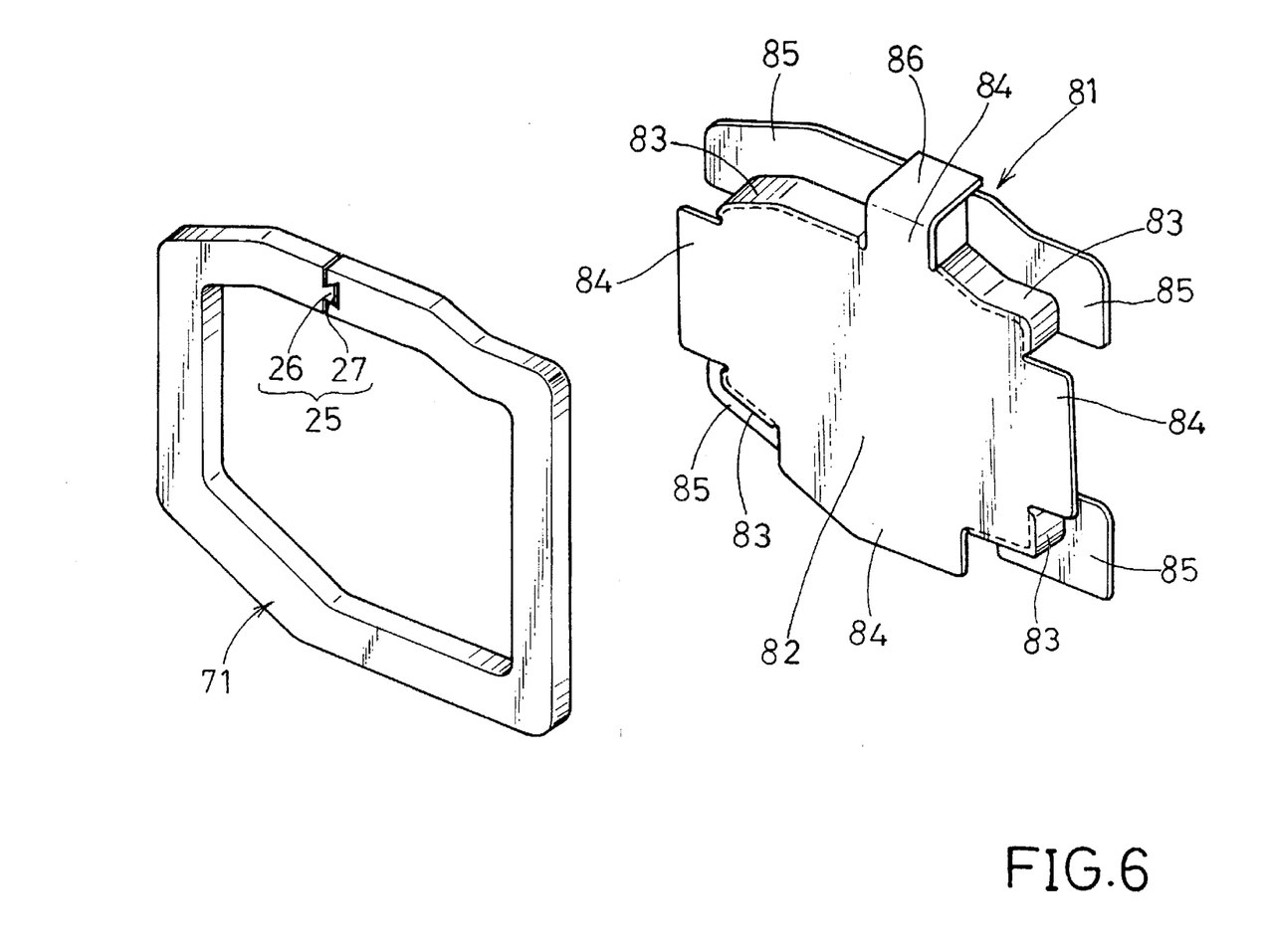
FIG. 6 is a perspective view of a support structure according to a second embodiment of the present invention, and in which a support member and a foamable material are shown in separated relation.

The support member 81 for retaining the foamable material 71 in the cavity 55 is integrally formed of a metal plate by press molding. The support member 81 is constituted of a planar main body 82, foamable material receiving walls 83 extending from and perpendicular to the main body 82, first restriction walls 84 outwardly extending from and coplanar to the main body 82, second restriction walls 85 outwardly extending from and perpendicular to the foamable material receiving walls 83 and also parallel to the first restriction walls 84, and a fixture flange 86 to be welded to an inner surface of the upper panel 52 of the hollow structural member 55 by spot welding.

The main body 82 is configured substantially to conform to the configuration of the transverse cross section of the cavity 55 and has an external dimension suitably smaller than the dimension of the cross section of the cavity 55. In this embodiment, as best shown in FIG. 1, the foamable material receiving walls 83 and the first restriction walls 84 are four in number, respectively, and are alternately arranged around the main body 82. The fixture flange 86 extends from and perpendicular to upper one of the first restriction walls 84.

The foamable material 71 is assembled to the support member 81 in a manner that an inner circumferential surface thereof faces outer surfaces of the foamable material receiving walls 83 and then the engagement projection 26 engages the engagement recess 27. As will be appreciated, unlike the first embodiment, the cut portion of the foamable material 71 is adapted to be deviated from the upper first restriction wall 84 on which the fixture flange 86 is formed, so that the engagement projection 26 easily engages the engagement recess 27 to facilitate assembly of the foamable material 71 to the support member 81.

Processes for incorporating the foamable material 71 into the hollow structural member 51 and subsequent operations will now be described.

The foamable material 71 as unfoamed is previously mounted on the support member 81 in which the inner circumferential surface thereof faces the outer surfaces of the foamable material receiving walls 83 and then the engagement projection 26 engages the engagement recess 27. Thus, the foamable material 71 is properly retained on the support member 81.

The support member 81 with the foamable material 71 is introduced into the upper panel 52 in such a manner that the first and second restrictive flanges 84 and 85 are perpendicular to the longitudinal direction of the upper panel 52. Thereafter, the fixture flange 86 formed on the upper first restriction wall 84 is welded to the inner surface of the upper panel 52 by spot welding. Thus, the foamable material 71 is positioned on the upper panel 52 together with the support member 81.

Subsequently, the upper panel 52, the lower panel 3 and the side panel 54 are welded at the flanges 52a, 53a and 54a thereof by spot welding to form the hollow structural member 51 having the closed box-like hollow shape and encapsulating the foamable material 71 therein. As should be apparent, in the hollow structural member 51 thus formed, the support member 81 is arranged in the cavity 55 in such a manner that the first and second restrictive flanges 84 and 85 are perpendicular to the longitudinal direction of the cavity 55.

Figure 11:
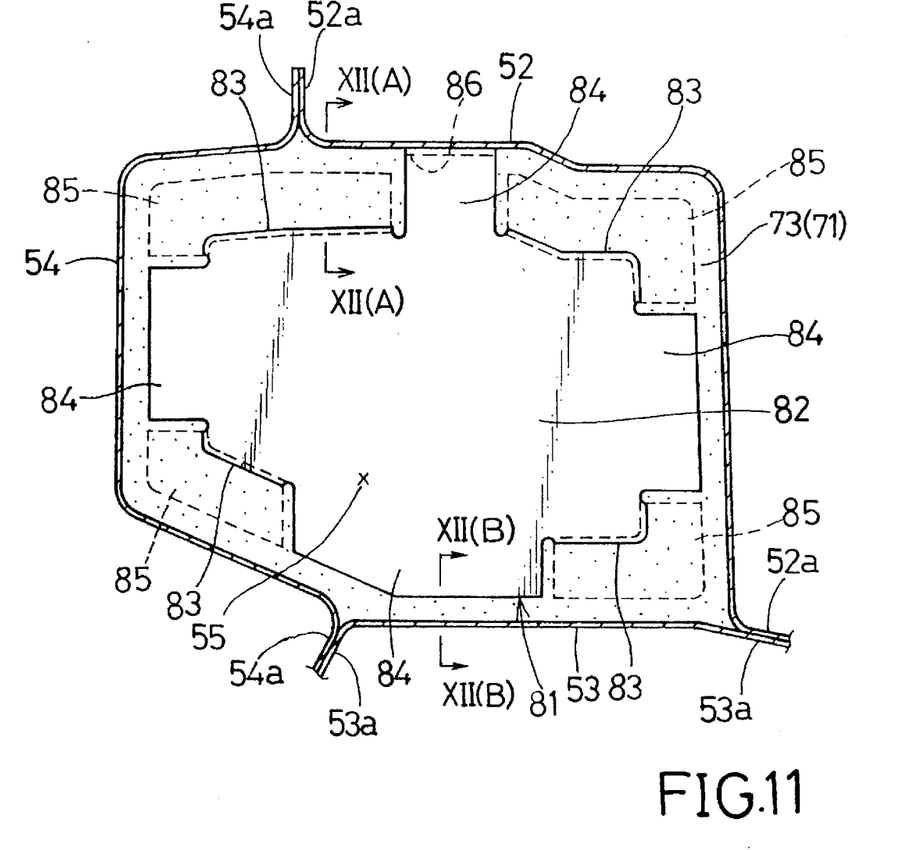
FIG. 11 is a side view of the support member and the foamable material as assembled and located in the cavity after the foamable material is foamed and expanded.
Figure 12A:
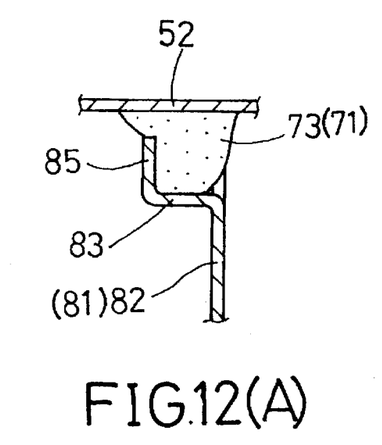
FIG. 12(A) is a sectional view taken along line XII(A)—XII(A) of FIG. 11.
Figure 12B:
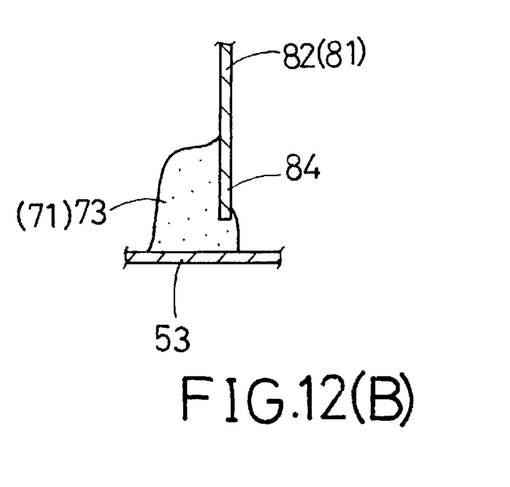
FIG. 12(B) is a sectional view taken along line XII(B)—XII(B) of FIG. 11.

Thereafter, the hollow structural member 51 with the foamable material 71 is heated by external heating, for example, by external heating for baking finishing of the automobile body. Thus, as shown in FIGS. 11 to 12(B), the foamable material 71 is foamed and expanded to produce the foamed product 73.

When the foamable material 71 is foamed and expanded by heating, the engagement projection 26 and the engagement recess 27 remain engaged with each other to close the cut portion of the foamable material 71. Further, the first and second restriction walls 34 and 35 prevent the foamable material 71 from expanding in the longitudinal direction of the cavity 55 of the hollow structural member 51, and this causes the foamable material 71 to be effectively foamed and expanded in directions perpendicular to the longitudinal direction of the cavity 5. This is because the foamable material 71 is retained between the first and second restriction walls 84 and 85 arranged perpendicular to the longitudinal direction of the cavity 55 so that both side surfaces thereof are restrictively covered by the first and second restriction walls 84 and 85. Therefore, the foamed product 73 thus produced is reliably adhered to an inner circumferential surface of the hollow structural member 51 and the outer surfaces of the foamable material receiving walls 83 of the support member 81. Further, as will be easily understood, the cut portion of the foamable material 71 is recombined by foaming of the foamable material 71. As a result, the cavity 55 is efficiently blocked by the foamed product 73 and the main body 82 of the support member 81.

Moreover, in the first and the second embodiments, the support member for retaining the foamable material in the cavity is integrally formed of a piece of metal plate by press molding. However, the support member may be constituted of a plurality of pieces of metal plates, if required. Alternatively, the support member can be formed by injection molding of synthetic resin except for the fixture flange which is to be welded to the hollow structural member.

Further, to secure the support member in the cavity of the hollow structural member, the fixture flange may be adhered to the inner surface of the hollow structural member by utilizing a heat resistant adhesive material and not by spot welding.

As apparent from the above description, according to the present invention, at least one side surface of the foamable material is restrictively covered by the first and second restriction flanges of the support member. Further, the support member retaining the foamable material is disposed in the cavity of the hollow structural member so that the first and second restrictive flanges are perpendicular to the longitudinal direction of the cavity. Therefore, when the foamable material is foamed and expanded by external heating, the support member prevents the foamable material from expanding in the longitudinal direction of the cavity, and this causes the foamable material to be effectively foamed and expanded in the directions perpendicular to the longitudinal direction of the cavity. As a result, the foamable material may efficiently block the cavity to increase damping powers and sound insulation powers of the hollow structural member without increasing the amount thereof.

The preferred embodiments herein described are intended to be illustrative of the invention and not to limit the invention to the precise form herein described. They are chosen and described to explain the principles of the invention and their application and practical use to enable others skilled in the art to practice the invention.

What is claimed is:

1. A support structure for supporting a foamable material in a cavity of a hollow structural member so that the foamable material blocks the cavity of the hollow structural member when it is foamed by external heating, comprising:

a support member including a main body having an external dimension smaller than the dimension of a transverse cross section of the cavity, a foamable material receiving wall provided on said main body, and a restriction flange extending from at least one of said main body and said foamable material receiving wall, said support member being disposed in the cavity in such a manner that said restriction flange is substantially perpendicular to the longitudinal direction of the cavity;

the foamable material having a substantially annular configuration and being profiled substantially to conform to the configuration of the transverse cross section of the cavity, the foamable material being arranged along said foamable material receiving wall of said support member.

2. The support structure as defined in claim 1, wherein said support member is further provided with a fixture flange to be secured to an inner circumferential surface of the hollow structural member.

3. The support structure as defined in claim 2, wherein said support member is integrally formed of a piece of metal plate by press molding.

4. The support structure as defined in claim 2, wherein said fixture flange is welded to the inner circumferential surface of the hollow structural member by spot welding for retaining said support member in the cavity.

5. The support structure as defined in claim 1, wherein the foamable material includes a cut portion and is provided with engagement means formed on said cut portion to close said cut portion by engagement.

6. The support structure as defined in claim 5, wherein said engagement means are constituted of an engagement projection and an engagement recess formed on opposed end surfaces of said cut portion.

7. The support structure as defined in claim 4, wherein said engagement projection and said engagement recess are formed as a dovetail tenon and a dovetail recess, respectively.

* * * * *